United States Patent
Wu et al.

(10) Patent No.: US 11,956,846 B2
(45) Date of Patent: Apr. 9, 2024

(54) RADIO LINK MONITORING FOR SIDELINK

(71) Applicant: APPLE INC., Cupertino, CA (US)

(72) Inventors: Zhibin Wu, Los Altos, CA (US); Fangli Xu, Beijing (CN); Chunxuan Ye, San Diego, CA (US); Dawei Zhang, Saratoga, CA (US); Haijing Hu, Los Gatos, CA (US); Haitong Sun, Cupertino, CA (US); Hong He, San Jose, CA (US); Jie Cui, San Jose, CA (US); Yuqin Chen, Beijing (CN)

(73) Assignee: Apple Inc., Cupertino, CA (US)

( * ) Notice: Subject to any disclaimer, the term of this patent is extended or adjusted under 35 U.S.C. 154(b) by 587 days.

(21) Appl. No.: 17/250,476

(22) PCT Filed: Jan. 31, 2020

(86) PCT No.: PCT/CN2020/074105
§ 371 (c)(1),
(2) Date: Jan. 26, 2021

(87) PCT Pub. No.: WO2021/151245
PCT Pub. Date: Aug. 5, 2021

(65) Prior Publication Data
US 2022/0312537 A1    Sep. 29, 2022

(51) Int. Cl.
*H04W 76/25* (2018.01)
*H04W 24/10* (2009.01)
(Continued)

(52) U.S. Cl.
CPC ........... *H04W 76/25* (2018.02); *H04W 24/10* (2013.01); *H04W 76/19* (2018.02); *H04W 92/18* (2013.01)

(58) Field of Classification Search
CPC ..... H04W 76/25; H04W 76/19; H04W 24/10; H04W 92/18
See application file for complete search history.

(56) References Cited

U.S. PATENT DOCUMENTS

2017/0311189 A1   10/2017   Almalfouh et al.
2019/0058556 A1    2/2019   Siomina et al.
(Continued)

FOREIGN PATENT DOCUMENTS

CN   105991247   10/2016
CN   110476379   11/2019
(Continued)

OTHER PUBLICATIONS

ZTE Corporation et al, "Consideration on sidelink RLM management" 3GPP RAN WG2, R2-1906477, May 2019, 6 sheets.
(Continued)

*Primary Examiner* — Michael Thier
*Assistant Examiner* — Nevena Zecevic Sandhu
(74) *Attorney, Agent, or Firm* — Fay Kaplun & Marcin, LLP (57) ABSTRACT

The exemplary embodiments relate to a user equipment (UE) performing radio link monitoring of a sidelink. The UE may transmit a signal over the sidelink and receive an indication of a type of hybrid automatic repeating request (HARQ) feedback in response to the signal. The UE may then generate a radio link metric associated with the sidelink based on the type of HARQ feedback. The UE may determine that the radio link metric satisfies a predetermined threshold and initiate a keep alive procedure for the sidelink based on the radio link metric satisfying the predetermined threshold.

18 Claims, 4 Drawing Sheets

Table 400

| Combinations 410 | Value 450 |
|---|---|
| Combination 412: NACK + DTX | x |
| Combination 414: NACK + DTX + DTX | y |
| Combination 416: DTX + NACK + NACK | z |
| Combination 418: ACK + DTX | Is not considered for radio link monitoring |

(51) Int. Cl.
    *H04W 76/19*     (2018.01)
    *H04W 92/18*     (2009.01)

(56) References Cited

U.S. PATENT DOCUMENTS

| | | | |
|---|---|---|---|
| 2019/0306878 A1 | 10/2019 | Zhang et al. | |
| 2019/0357064 A1 | 11/2019 | Hosseini et al. | |
| 2020/0205166 A1* | 6/2020 | Huang | H04W 76/27 |
| 2021/0050953 A1* | 2/2021 | Park | H04L 1/1864 |
| 2022/0022085 A1* | 1/2022 | Ji | H04W 76/19 |

FOREIGN PATENT DOCUMENTS

| | | |
|---|---|---|
| TW | 201939984 | 10/2019 |
| WO | 2019103670 | 5/2019 |

OTHER PUBLICATIONS

LG Electronics, "Remaining issue on PC5 RLM", 3GPP RAN WG2, R2-1915515, Nov. 2019, 4 sheets.

Interdigital Inc., "On Physical Layer Procedures for Nr V2X Sidelink", 3GPP RAN WG1, R1-1905405, Apr. 2019, 10 sheets.

Vivo, "Discussion on sidelink radio link management without physical", 3GPP TSG-RAN WG2 R2-191493222, Nov. 2019.

Huawei et al., "Sidelink physical layer procedures for NR V2X", 3GPP TSG RAN WG1 R1-191188722, Nov. 2019.

Asia Pacific Telecom, "Discussion on RLM and RLF in NR sidelink", 3GPP TSG-RAN WG1 R1-191225122, Nov. 2019.

* cited by examiner

Table 400

| Combinations 410 | Value 450 |
|---|---|
| Combination 412: NACK + DTX | x |
| Combination 414: NACK + DTX + DTX | y |
| Combination 416: DTX + NACK + NACK | z |
| Combination 418: ACK + DTX | Is not considered for radio link monitoring |

Fig. 4

RADIO LINK MONITORING FOR SIDELINK

BACKGROUND

A user equipment (UE) may be configured with multiple communication links. For example, the UE may receive a signal from a cell of a corresponding network over a downlink and may transmit a signal to the cell of the corresponding network over an uplink. The UE may also be configured to communicate with a further UE via a sidelink. The term sidelink refers to a communication link that may be utilized for device-to-device (D2D) communication. Thus, the sidelink may facilitate communication between the UE and the further UE without the use of a cell.

Radio link monitoring generally refers to a mechanism configured to monitor the quality of a radio link for determining whether the radio link is of sufficient quality to be used by the UE. Traditional radio link monitoring techniques used for downlink and/or uplink communications may rely on indications included in layer 1 (L1) signaling. However, these traditional techniques may not be compatible with sidelink communications. Accordingly, there exists a need for radio link monitoring techniques that do not rely on indications included in L1 signaling.

SUMMARY

According to an exemplary embodiment a method is performed at a user equipment (UE) configured with a sidelink. The method comprising, transmitting a signal over the sidelink and receiving an indication of a type of hybrid automatic repeating request (HARQ) feedback in response to the signal. The method further comprising, generating a radio link metric associated with the sidelink based on the type of HARQ feedback. The method further comprising, determining that the radio link metric satisfies a predetermined threshold. The method further comprising, initiating a keep alive procedure for the sidelink based on the radio link metric satisfying the predetermined threshold.

Further exemplary embodiments include a method performed at a user equipment (UE) configured with a sidelink. The method includes, transmitting a signal over the sidelink to a further UE and receiving an instance of hybrid automatic repeating request (HARQ) feedback. The method further includes, determining whether the instance of HARQ feedback is to be utilized to generate a radio link metric associated with the sidelink, wherein the instance of HARQ feedback is a type of HARQ feedback. When the instance of HARQ feedback is to be utilized to generate a radio link metric associated with the sidelink, generating the radio link metric associated with the sidelink based on the type of HARQ feedback.

Still further exemplary embodiments include a user equipment (UE), comprising a transceiver configured to communicate via a sidelink and a processor configured to perform operations. The operations comprising, transmitting a signal over the sidelink and receiving an indication of a type of hybrid automatic repeating request (HARQ) feedback in response to the signal. The operations further comprising, generating a radio link metric associated with the sidelink based on the type of HARQ feedback. The operations further comprising, determining that the radio link metric satisfies a predetermined threshold. The operations further comprising, initiating a keep alive procedure for the sidelink based on the radio link metric satisfying the predetermined threshold.

DETAILED DESCRIPTION

The exemplary embodiments may be further understood with reference to the following description and the related appended drawings, wherein like elements are provided with the same reference numerals. The exemplary embodiments relate to radio link monitoring for a sidelink. As will be described in detail below, hybrid automatic repeat request (HARQ) feedback may provide the basis for radio link monitoring of the sidelink. Accordingly, unlike the traditional approaches referenced above, the exemplary embodiments utilize indications such as HARQ feedback for radio link monitoring of the sidelink, without relying on the in-sync and out-of-sync indications from the physical layer.

The exemplary embodiments are described with regard to the UE. However, the use of a UE is merely provided for illustrative purposes. The exemplary embodiments may be utilized with any electronic component that is configured with the hardware, software, and/or firmware to exchange information (e.g., control information) and/or data with the network. Therefore, the UE as described herein is used to represent any suitable electronic device.

The exemplary embodiments are also described with regard to a sidelink. The term "sidelink" generally refers to a communication link between the UE and a further UE. The sidelink provides direct device-to-device (D2D) communication where information and/or data exchanged between the UE and the further UE via the sidelink does not go through a cell. In some configurations, a single sidelink provides bidirectional communication between the UE and the further UE. In other configurations, a single sidelink provides unidirectional communication between the UE and the further UE. The exemplary embodiments may apply to either a bidirectional or unidirectional sidelink.

Sidelink communications are supported by both Long-Term Evolution (LTE) and 5G new radio (NR) standards. In some configurations, the network may provide information to the UE that indicates how a sidelink is to be established, maintained and/or utilized. Thus, while the information and/or data exchanged over the sidelink does not go through a cell, the UE and the network may exchange information associated with the sidelink. In other configurations, a sidelink is not under the control of the network. In either configuration, the UE and the further UE may still perform synchronization procedures, discovery procedures and exchange control information corresponding to the sidelink.

As indicated above, the exemplary embodiments relate to radio link monitoring for a sidelink. Radio link monitoring generally refers to a mechanism configured to monitor the quality of a radio link for determining whether the radio link is suitable for communication. Traditional radio link monitoring techniques for downlink and/or uplink communications utilize indications from Layer 1 (L1) signaling. For example, the UE may collect measurement data based on the L1 signaling (e.g., reference signals) and generate one or more radio link monitoring metrics. The radio link monitoring metrics may then be used to determine whether radio link failure (RLF) is to be declared. However, these traditional L1 approaches may not be compatible with sidelink communications, especially in the absence of periodic reference signals.

The exemplary embodiments may monitor the radio link quality corresponding to the sidelink based on hybrid automatic repeat request (HARQ) signaling. Unlike traditional approaches that rely on L1 signaling, the exemplary radio link monitoring techniques may utilize indications such as HARQ feedback. However, any reference to HARQ is merely provided for illustrative purposes, the exemplary embodiments may utilize any appropriate feedback mechanism in sidelink communication.

HARQ signaling generally refers to a signaling exchange in which information and/or data is sent from a transmitting device to a receiving device and in response, feedback is provided to the transmitting device. Throughout this description, the term "UE" may be used to represent the transmitting device and the term "further UE" may be used to represent the receiving device. For example, consider a scenario in which the UE is configured with a sidelink to the further UE. Initially, the UE may transmit information and/or data to the further UE via the sidelink. In response, the UE may receive feedback from the further UE. When the feedback indicates that the further UE successfully received the information and/or data from the UE, the UE may assume that the quality of the sidelink is sufficient and continue to utilize the sidelink to communicate with the further UE. However, as will be demonstrated below, other types of HARQ feedback may indicate to the UE that the quality of the sidelink is degrading.

When the UE is configured with a sidelink, the UE may characterize a type of HARQ feedback as "nothing received (DTX)." DTX feedback may occur due to any of a variety of different factors. In fact, even when the receiving device (e.g., the further UE) successfully receives the transmission from the transmitting device (e.g., UE), DTX feedback may be declared at the transmitting device. The exemplary embodiments provide various techniques for determining that DTX feedback is unlikely to have been generated due to the performance of the sidelink. This ensures that radio link monitoring of the sidelink is not influenced by factors that are not relevant to the quality of the sidelink.

Figure 1:
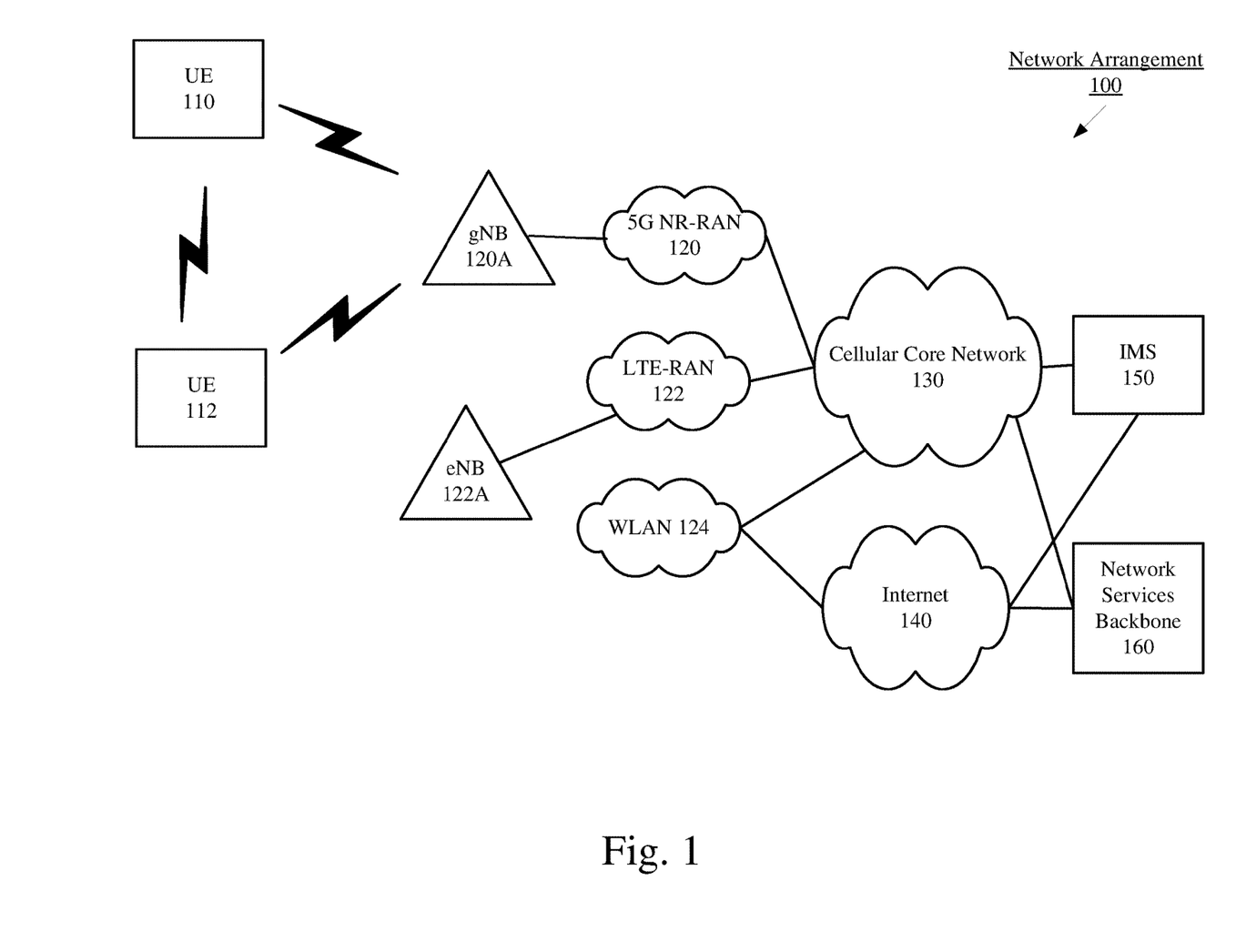
FIG. 1 shows an exemplary network arrangement according to various exemplary embodiments.

FIG. 1 shows an exemplary network arrangement 100 according to various exemplary embodiments. The exemplary network arrangement 100 includes UEs 110, 112. Those skilled in the art will understand that the UEs 110, 112 may be any type of electronic component that is configured to communicate via a network, e.g., a component of a connected car, a mobile phone, a tablet computer, a smartphone, a phablet, an embedded device, a wearable, an Internet of Things (IoT) device, etc.

Throughout this description, the terms UE 110, UE and transmitting device may be used interchangeably. Additionally, the terms UE 112, further UE and receiving device may be also used interchangeably. It should also be understood that an actual network arrangement may include any number of UEs being used by any number of users. Thus, the example of two UEs 110, 112 is merely provided for illustrative purposes.

The UEs 110, 112 may communicate directly with one or more networks. In the example of the network configuration 100, the networks with which the UEs 110, 112 may wirelessly communicate are a 5G NR radio access network (5G NR-RAN) 120, an LTE radio access network (LTE-RAN) 122 and a wireless local access network (WLAN) 124. These types of networks support vehicle-to-everything (V2X) and/or sidelink communication. However, the UE 110 may also communicate with other types of networks and the UE 110 may also communicate with networks over a wired connection. Therefore, the UEs 110, 112 may include a 5G NR chipset to communicate with the 5G NR-RAN 120, an LTE chipset to communicate with the LTE-RAN 122 and an ISM chipset to communicate with the WLAN 124.

The 5G NR-RAN 120 and the LTE-RAN 122 may be portions of cellular networks that may be deployed by cellular providers (e.g., Verizon, AT&T, Sprint, T-Mobile, etc.). These networks 120, 122 may include, for example, cells or base stations (Node Bs, eNodeBs, HeNBs, eNBS, gNBs, gNodeBs, macrocells, microcells, small cells, femtocells, etc.) that are configured to send and receive traffic from UEs that are equipped with the appropriate cellular chip set. The WLAN 124 may include any type of wireless local area network (WiFi, Hot Spot, IEEE 802.11x networks, etc.).

The UEs 110, 112 may connect to the 5G NR-RAN via the gNB 120A. The gNB 120A may be configured with the necessary hardware (e.g., antenna array), software and/or firmware to perform massive multiple in multiple out (MIMO) functionality. Massive MIMO may refer to a base station that is configured to generate a plurality of beams for a plurality of UEs. Reference to a single gNB 120A is merely for illustrative purposes. The exemplary embodiments may apply to any appropriate number of gNBs. The UEs 110, 112 may also connect to the LTE-RAN 122 via the eNB 122A.

Those skilled in the art will understand that any association procedure may be performed for the UEs 110, 112 to connect to the 5G NR-RAN 120 and the LTE-RAN 122. For example, as discussed above, the 5G NR-RAN 120 and the LTE-RAN 122 may be associated with a particular cellular provider where the UEs 110, 112 and/or the user thereof has a contract and credential information (e.g., stored on a SIM card). Upon detecting the presence of the 5G NR-RAN 120, the UEs 110, 112 may transmit the corresponding credential information to associate with the 5G NR-RAN 120. More specifically, the UEs 110, 112 may associate with a specific base station (e.g., the gNB 120A of the 5G NR-RAN 120, the eNB 122A of the LTE-RAN 122).

The UEs 110, 112 may also communicate with one another directly using a sidelink. The sidelink is a direct D2D communication link. Thus, the information and/or data transmitted directly to the other endpoint (e.g., the UE 110 or the UE 112) does not go through a cell (e.g., gNB 120A, eNB 122A). In some embodiments the UEs 110, 112 may receive information from a cell regarding how the sidelink is to be established, maintained and/or utilized. Thus, a network (e.g., the 5G NR-RAN 120, LTE-RAN 122) may control the sidelink. In other embodiments, the UEs 110, 112 may control the sidelink. Regardless of how the sidelink is controlled, the UEs 110, 112 may maintain a downlink/uplink to a currently camped cell (e.g., gNB 120A, eNB 122A) and a sidelink to the other UE simultaneously.

In addition to the networks 120, 122 and 124 the network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network. The cellular core network 130 also manages the traffic that flows between the cellular network and the Internet 140. The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2:
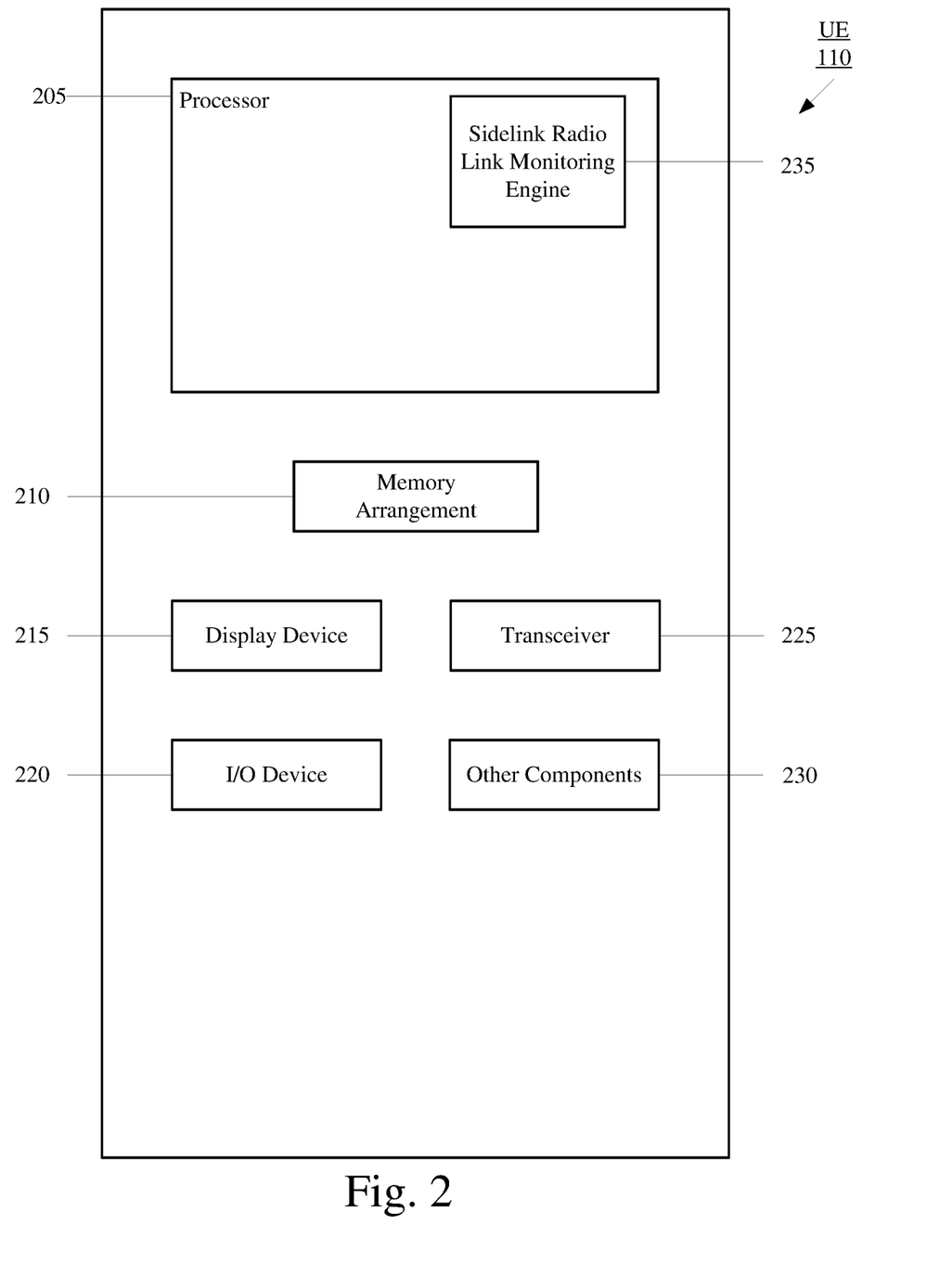
FIG. 2 shows an exemplary UE according to various exemplary embodiments.

FIG. 2 shows an exemplary UE 110 according to various exemplary embodiments. The UE 110 will be described with regard to the network arrangement 100 of FIG. 1. The UE 110 may include a processor 205, a memory arrangement 210, a display device 215, an input/output (I/O) device 220, a transceiver 225, an antenna panel 230 and other components 235. The other components 235 may include, for example, a SIM card, an embedded SIM (eSIM), an audio input device, an audio output device, a power supply, a data acquisition device, ports to electrically connect the UE 110 to other electronic devices, etc. The UE 110 illustrated in FIG. 2 may also represent the UE 112.

The processor 205 may be configured to execute a plurality of engines of the UE 110. For example, the engines may include a sidelink radio link monitoring engine 235. The sidelink radio link monitoring engine 235 may monitor HARQ feedback and generate radio link monitoring metrics based on the HARQ feedback. The radio link monitoring metrics may then be used to trigger further action by the UE 110, e.g., check the viability of the link, declare RLF, etc.

The above referenced engines each being an application (e.g., a program) executed by the processor 205 is only exemplary. The functionality associated with the engines may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UEs, the functionality described for the processor 205 is split among two or more processors such as a baseband processor and an applications processor. The exemplary embodiments may be implemented in any of these or other configurations of a UE.

The memory arrangement 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the 5G NR-RAN 120, the WLAN 122, etc. Accordingly, the transceiver 225 may operate on a variety of different frequencies or channels (e.g., set of consecutive frequencies).

As mentioned above, the exemplary embodiments relate to utilizing HARQ feedback for radio link monitoring of a sidelink. The exemplary embodiments may characterize the HARQ feedback as an acknowledgement (ACK), a negative acknowledgement (NACK) or nothing received (DTX). An ACK may indicate that the information and/or data was successfully received by the receiving device. A NACK may indicate that the information and/or data was not successfully received by the receiving device. For example, the receiving device may not have actually received the transmission or may have been unable to decode at least a portion of the contents of the transmission. DTX feedback may indicate that the HARQ feedback was not successfully received by the transmitting device. For example, the transmitting device may have not actually received the feedback, may be unable to decode at least a portion of the feedback or the feedback may be ambiguous. However, reference to three types of HARQ feedback (ACK, NACK and DTX) are merely provided for illustrative purposes. Additional types of feedback may be utilized and different entities may refer to similar concepts by different names.

Under conventional circumstances, HARQ feedback is not intended to be utilized for radio link monitoring. Instead, HARQ signaling may be performed for error control purposes. Thus, the exemplary embodiments may monitor the HARQ feedback that is already being provided for error control purposes and leverage this available information for radio link monitoring purposes. For example, as will be described in more detail below with regard to FIG. 3, an ACK may indicate that a sidelink is of sufficient quality for continued use. Alternatively, NACKs and DTXs may indicate that the sidelink is not of sufficient quality for continued use. However, not all DTX feedback is indicative of a degradation in the quality of the sidelink. Accordingly, as will be described in more detail below, various techniques may be utilized to determine whether DTX feedback was likely caused by a degradation in sidelink quality.

Figure 3:
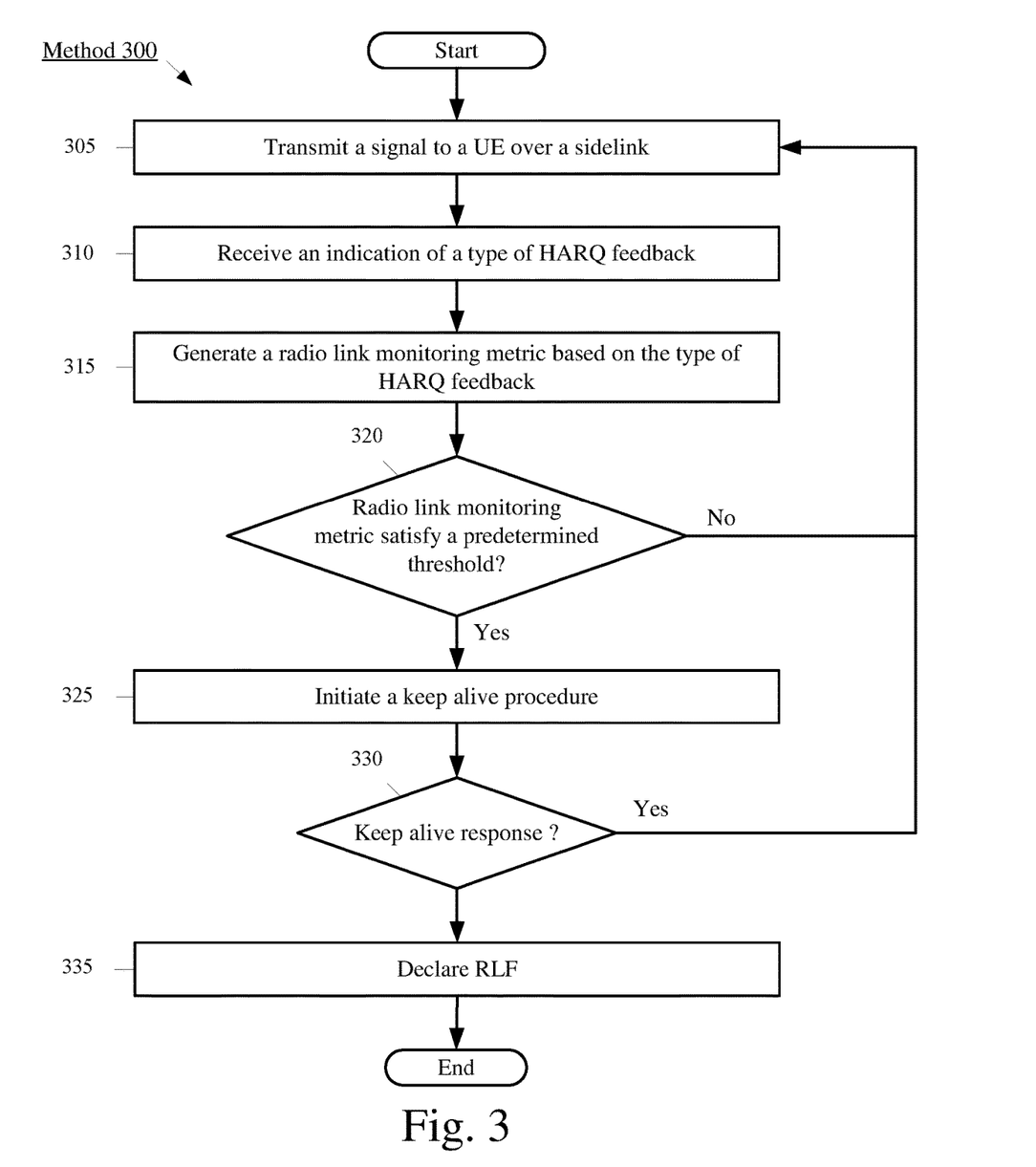
FIG. 3 shows a method for radio link monitoring for a sidelink according to various exemplary embodiments.

FIG. 3 shows a method 300 for radio link monitoring for a sidelink according to various exemplary embodiments. The method 300 is described with regard to the network arrangement 100 of FIG. 1 and the UE 110 of FIG. 2.

Initially, consider the following exemplary scenario in which the UE 110 is configured to transmit information and/or data over a sidelink to the UE 112. The sidelink communication is configured with HARQ functionality. Thus, transmissions performed by the UE 110 over the sidelink may be configured to trigger the UE 112 to provide HARQ feedback to the UE 110. Those of ordinary skill in the art will understand how the sidelink may be established, the type of bearers used for the sidelink, the type of traffic that may be provided over the sidelink and how the HARQ feedback may be provided over the air to the UE 110. These aspects of sidelink communications are not relevant to the exemplary embodiments and any appropriate procedures, bearers and traffic may be utilized. Instead, the exemplary embodiments relate to how to track radio link monitoring metrics corresponding to the sidelink based on HARQ feedback.

In 305, the UE 110 transmits a signal to the UE 112 over the sidelink. The signal may be configured to include information that indicates to the UE 112 that HARQ feedback is to be provided to the UE 110. In some embodiments, the signal may be transmitted in accordance with the expected functionality of the UE 110. In other embodiments, the signal may be triggered for radio link monitoring purposes.

In 310, the UE 110 (e.g., the sidelink radio link monitoring engine 235) receives an indication of a type of HARQ feedback. The UE 110 may be equipped with various mechanisms that are configured to determine whether HARQ feedback has been received over the air and process the HARQ feedback to determine whether to declare the HARQ feedback an ACK, NACK or DTX. After the type of HARQ feedback has been declared, the sidelink radio link monitoring engine 235 may receive the indication of the type of HARQ feedback from any appropriate source (e.g., a medium access control (MAC) entity, a L2 entity, etc.).

In 315, the UE 110 (e.g., the sidelink radio link monitoring engine 235) generates a radio link monitoring metric based on the type of HARQ feedback. For example, the UE 110 may maintain a link quality index value that takes into account each HARQ feedback individually.

The link quality index value may initially be set to a first value (n) when the sidelink is established. If a NACK is received, the link quality index value may be incremented by a second value (m). For example, if a NACK is initially received, the link quality index value may be (n+m). If an ACK is received, the link quality index value may be reset to the first value (n). For example, if the link quality index value is currently set to (n+m), the link quality index value may be reset to (n) if an ACK is received.

In some embodiments, if DTX feedback is declared, the link quality index value may be multiplied by a predetermined value. For example, if the link quality index value is currently set to (n+m), the link quality index value may be set to ((n+m)*the predetermined value). In other embodiments, if DTX feedback is declared, the link quality index value may be incremented by a third value (p) that is larger than the second value (m). For example, if the link quality index is currently set to (n), the link quality index value may be set to (n+p). However, reference to a link quality index value is merely provided for illustrative purposes. The exemplary embodiments may apply to any appropriate radio link monitoring metric generated based on any appropriate one or more factors.

If the UE 110 declares DTX feedback, the UE 110 may first utilize any of a variety of different techniques to corroborate the assumption that DTX feedback is indicative of a degradation in the quality of the sidelink. Thus, not all DTX feedback may be used in radio link monitoring of the sidelink. These techniques will be described in more detail below after the description of the method 300.

In 320, the UE 110 (e.g., the sidelink radio link monitoring engine 235) determines whether the radio link monitoring metric satisfies a predetermined threshold. This may indicate to the UE 110 whether the sidelink is of sufficient quality to be used by the UE 110 for subsequent transmissions.

For example, if the radio link monitoring metric generated in 315 is greater than or equal to the threshold value, the predetermined threshold may be satisfied. This may indicate that the quality of the sidelink has degraded and the sidelink is no longer of sufficient quality to be used by the UE 110. This may occur when the UE 110 receives one or more NACKs and/or one or more DTXs consecutively. Continuing with the above example, if the radio link monitoring metric generated in 315 is less than or equal to the threshold value, the predetermined threshold may not be satisfied. This may indicate that the quality of the sidelink is of sufficient quality to be used for a subsequent transmission.

The parameters such as the predetermined threshold, the value for the NACK and the value for the DTX feedback may be determined based on any of a variety of different factors. For example, the network may provide these values to the UE 110 via radio resource control (RRC) signaling. In some embodiments, this exchange may be facilitated by a system information block (SIB). In other embodiments, this exchange may be facilitated by dedicated RRC signaling. In further embodiments, the network may preconfigure these values using RRC signaling such that the values are available to the UE 110 when the network is not in control of the sidelink. Thus, regardless of whether the network is in control of the sidelink, the network may provide the predetermined threshold, the value for the NACK and the value for the DTX feedback to the UE 110. In another example, these parameters can be overridden during an RRC negotiation between the UE 110 and the network. However, the above examples are merely provided for illustrative purposes, the exemplary embodiments may determine these parameters using any appropriate one or more factors.

Returning to 320, if the predetermined threshold is not satisfied, the method 300 may return to 305 where the above described process repeats itself for the next transmission that is to be performed over the sidelink. If the predetermined threshold is satisfied, the method 300 may continue to 325. In 325, the UE 110 may initiate a keep alive procedure corresponding to the sidelink with the UE 112.

Conventionally, the keep alive procedure may be configured as a check of the sidelink and ensures that the UE 110 and the UE 112 are still within range of one another. Those skilled in the art will understand that the keep alive procedure may be performed periodically and include a signaling exchange in which the UE 110 sends a keep alive message to the UE 112. For example, the keep alive procedure may involve transmitting a keep alive message to the UE 112 one or more times, depending on whether retransmission is used or not. The keep alive message may be configured to trigger the UE 112 to provide a keep-alive-ACK to the UE 110. If the keep-alive-ACK is not provided within a predetermined duration relative to the transmission of the keep alive message, the UE 110 may assume that the sidelink is no longer a viable communication channel.

In 330, the UE 110 determines whether a response to the keep alive message (e.g., keep-alive-ACK) is received within a predetermined duration. If the UE 110 receives the response to the keep alive message within the predetermined duration, the method 300 may return to 305 where the above described process repeats for the next transmission that is to be performed over the sidelink. If the UE 110 does not receive a response to the keep alive message within the predetermined duration, the method 300 may continue to 335 where a radio link failure (RLF) is declared.

The exemplary embodiments utilize the keep alive procedure to check the viability of the sidelink when the radio link metric indicates that the quality of the sidelink has degraded beyond acceptable limits, e.g. due to physical layer problems or MAC scheduling issues. This may be performed to ensure that an RLF is not declared based on DTX feedback that is generated due to factors unrelated to the quality/performance of the sidelink. Other techniques that may be utilized to corroborate an assumption that DTX feedback is indicative of a degradation in the quality of the sidelink are described below.

In 335, the UE 110 declares an RLF for the sidelink. This may cause the UE 110 to tear down the bearers of the sidelink and release the connection. Subsequently, the method 300 ends.

As indicated above, DTX feedback may be generated due to any of a variety of different factors. In some scenarios, DTX feedback may be generated at the transmitting device even when the corresponding transmission was successfully received by the receiving device. The exemplary embodiments provide various techniques to ensure that DTX feedback is considered a factor in radio link monitoring only when it is likely that the DTX feedback was caused due to a degradation in quality of the sidelink.

To provide an example of a type of scenario in which DTX feedback is not indicative of an issue with the sidelink, consider an exemplary scenario in which the UE 110 may be configured with a first sidelink to a first UE and a second sidelink to a second UE. From the perspective of the UE 110, the first and second sidelink may share the resources of the physical sidelink feedback channel (PSFCH) and the physical sidelink control channel (PSCCH). Accordingly, scenarios may arise in which HARQ feedback that is transmitted to the UE 110 and HARQ feedback that is to be transmitted by the UE 110 may be scheduled to occupy the same slot. The UE 110 may not be able to transmit and receive in the same slot and thus, has to decide whether to transmit the HARQ feedback or listen for HARQ feedback. If the UE 110 decides to transmit HARQ feedback instead of listening for HARQ feedback, the UE 110 may not receive the feedback that is sent to the UE 110. As a result, DTX feedback may be declared despite an ACK (or NACK) actually being transmitted to the UE 110. Thus, even when the UE 110 and the UE 112 are in close proximity and have sidelink of sufficient quality, DTX feedback may be declared.

To provide another example of a type of scenario in which DTX feedback is not indicative of an issue with the sidelink, consider an exemplary scenario in which the receiving device (e.g., UE 112) is configured with multiple communication links (e.g., one or more uplinks, one or more sidelinks, etc.). The UE 112 may only have a certain transmit power limit and thus, may be unable to adequately perform all of its scheduled transmissions. As a result, the transmission of HARQ feedback may be omitted by the UE 112 and DTX may be declared at the UE 110 despite the UE 112 successfully receiving the information and/or data transmitted by the UE 110. The above examples are only provided for illustrative purposes and are not intended to limit the exemplary embodiments in any way. Instead, the above examples are merely provided as a general example of why the UE 110 may not want to declare an RLF based on DTX feedback alone.

A first exemplary technique for determining that an instance of DTX is not to be considered for radio link monitoring relates to determining whether the receiving device has any physical layer constraints that may prevent the transmission of HARQ feedback. For instance, the UE 110 may determine whether the UE 112 has any constraints with regard to transmitting HARQ feedback to the UE 110. These constraints may relate to whether the UE 112 is configured to perform other transmissions unrelated to the sidelink being monitored. For example, if the UE 112 is configured to provide HARQ feedback for a different sidelink with the UE 110 or a different sidelink with a different UE, a scenario may arise in which the HARQ feedback for the sidelink being monitored is not transmitted by the UE 112 to the UE 110. For instance, from the perspective of the UE 112, a protocol data unit (PDU) associated with the HARQ feedback for the UE 110 may have a lower priority than a PDU associated with the HARQ feedback for the other sidelink. As a result, the UE 112 may not transmit the lower priority HARQ feedback and DTX may be declared at the UE 110. Similarly, if both HARQ feedbacks are scheduled to be transmitted over the PSFCH and overlap in time, the UE 112 may not have the available hardware and/or software resources to transmit HARQ feedback to the UE 110.

From the perspective of the UE 110, the UE 110 may monitor the PSSCH for L1 IDs associated with the UE 112 to track the resource usage of the UE 112. If the UE 110 identifies that the UE 112 has transmitted or received a signal indicating that HARQ is enabled and has a high priority, the UE 110 may assume that DTX feedback associated with the UE 112 is due to the UE 112 being preoccupied with performing operations for a different sidelink. Thus, by monitoring over the air traffic associated with the UE 112, the UE 110 may assume that DTX feedback is not due to an issue with the sidelink being monitored. As a result, this instance of DTX may be omitted from being considered in radio link monitoring of the sidelink.

A second exemplary technique for determining that an instance of DTX is not to be considered for radio link monitoring relates to considering the type of HARQ feedback received before and/or after DTX feedback is declared. For example, the method 300 was described with regard to handling each instance of HARQ feedback individually, where a link quality index value is generated based on the previous value of the link quality index value and the type of HARQ feedback received. In contrast, this technique relates to generating a link quality index value based on the previous value of the link quality index value and a combination of HARQ feedback signals.

Figure 4:
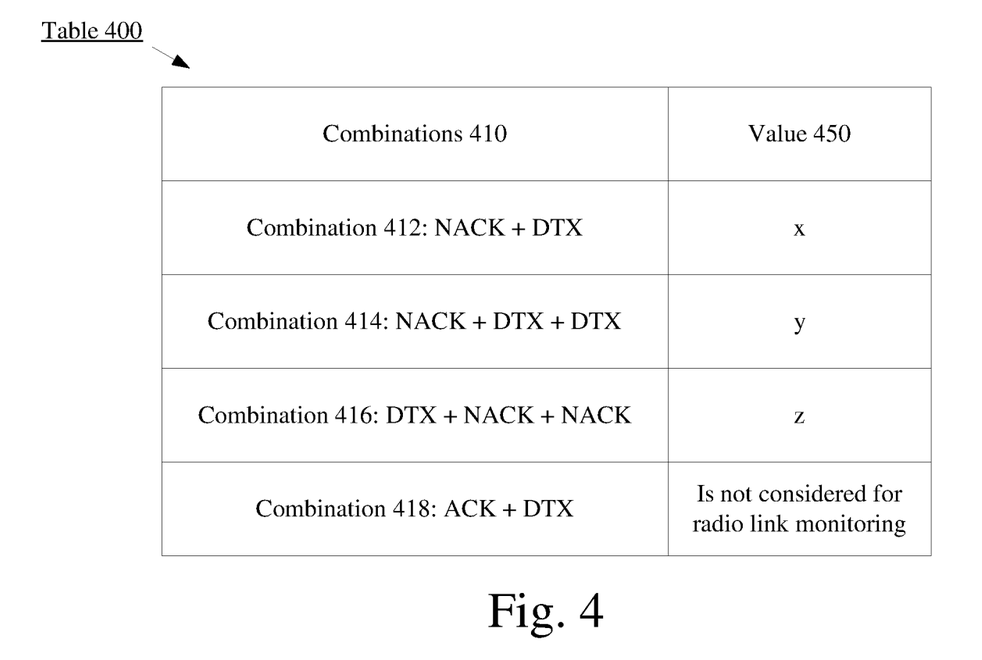
FIG. 4 shows an exemplary table that illustrates how the UE may generate a link quality index value based on a combination of HARQ feedback signals according to various exemplary embodiments.

FIG. 4 shows an exemplary table 400 that illustrates how the UE 110 may generate a link quality index value based on a combination of HARQ feedback signals according to various exemplary embodiments. The table 400 includes two columns 410, 450. Column 410 shows examples of some types of HARQ feedback combinations. Column 450 shows example values for the corresponding combinations of HARQ feedback. However, the examples in the table 400 are merely provided for illustrative purposes and are not intended to limit the exemplary embodiments in any way. The exemplary embodiments may consider any appropriate combination of HARQ feedback in any appropriate manner and may store this type of information in any appropriate format.

In this example, combination 412 illustrates that if a NACK is received and then DTX feedback is declared a value (x) may be used to determine the link quality index value. To provide an example, when the NACK is received the UE 110 may generate a first link quality index value in accordance with the method 300. When the DTX is received, the UE 110 may generate a second link quality index value based on a combination of the first link quality index value and (x). With regard to the example provided in the method 300, the value (x) may be greater than the value (p) because receiving a NACK and then a DTX consecutively is a stronger indicator of a degradation in quality of the sidelink than a single instance of DTX feedback.

Combination 414 illustrates that if a NACK is received, first DTX feedback is declared and then second DTX is declared, a value of (y) may be used to determine the link quality index value. To provide an example, when the NACK is received the UE 110 may generate a first link quality index value in accordance with the method 300. When the first DTX is received, the UE 110 may generate a second link quality index value based on a combination of the first link quality index value and (x). When the second DTX is received, the UE 110 may generate a third link quality index value based on a combination of the second link quality index value and (y). With regard to the example provided above, the value (y) may be greater than the value (x) because receiving a NACK, a DTX and a further DTX consecutively is a stronger indicator of a degradation in quality of the sidelink than receiving a NACK and then a DTX consecutively.

Combination 416 illustrates that if a first DTX is received, a NACK is received and then a second DTX is received a value of (z) may be used to determine the link quality index value. With regard to the examples provided above, the value (z) may be greater than (x) but less than (y) because receiving a sequence of two DTXs separated by a NACK is a stronger indication of a degradation in quality of the sidelink than only receiving a sequence of one NACK and one DTX (e.g., (x)) but not as strong of an indication as receiving a sequence of a NACK and then two consecutive DTXs (e.g., (y)).

Combination 418 illustrates that if a first DTX is received by the UE 110 after an ACK, then the DTX may not be considered for radio link monitoring. In some embodiments, the UE 110 may ignore DTX feedback and not consider it for radio link monitoring if the DTX feedback is not received adjacent to further DTX feedback and/or NACK feedback. In this type of scenarios, the UE 110 may assume that the sidelink is of sufficient quality due to the previously received ACK and the DTX feedback was not due to a degradation in the quality of the sidelink.

A third exemplary technique for determining that an instance of DTX feedback is not to be considered for radio link monitoring relates to collecting and evaluating measurement data. For example, sidelink measurement data may be collected for RRC purposes or a channel state information (CSI) report. If the measurement data indicates that the signal transmitted over the sidelink is weak or that the quality of the channel is degrading, the UE 110 may assume that an instance of DTX feedback is likely caused due to an issue with the sidelink.

Another type of measurement data may relate to the channel busy ratio (CBR). If the CBR is low, the UE 110 may assume that a DTX is likely caused by a problem with the sidelink. Thus, in some embodiments, the UE 110 may maintain a radio monitoring link metric corresponding to the CBR. This radio monitoring link metric changes based on CBR measurements. If the radio monitoring link metric exceeds a threshold value, an instance of DTX feedback may not be considered for radio link monitoring.

Another type of measurement data may relate to the number sidelink transmissions being performed by the UE 110. As the number of sidelink transmissions increases, the reliability of DTX feedback decreases. Thus, if a particular number of sidelink transmissions occur within a predetermined time window, the UE 110 may assume that an instance of DTX is likely unrelated to an issue with the sidelink. However, these exemplary techniques are merely provided for illustrative purposes, the exemplary embodiments may utilize any appropriate factor to determine whether DTX feedback is to be considered for radio link monitoring.

In some exemplary embodiments, if the third exemplary technique is being used, the UE 110 may not consider either ACKs or NACKs for radio link monitoring. Instead, the UE 110 may consider only DTX feedback and apply the exemplary factors described above (or any other appropriate factor) to corroborate the assumption of link degradation.

HARQ may not be active for every sidelink. In this type of scenario, the UE 110 may utilize HARQ feedback corresponding to a first sidelink for radio link monitoring of a second sidelink. For example, the UE 110 may have sidelink A with the UE 112 and a separate sidelink B with the UE 112. HARQ may be disabled for sidelink A and active for sidelink B. Since the radio link quality relates to the air interface between the UEs 110, 112 and is not specific to a single sidelink bearer, the UE 110 may utilize HARQ feedback corresponding to sidelink B to perform radio link monitoring of sidelink A.

Similarly, HARQ feedback from a groupcast may be used for radio link monitoring of the sidelink. For example, if the UE 110 has a sidelink with UE 112 and is also part of a groupcast that includes the UE 112, the UE 110 may receive HARQ feedback from the UE 112 corresponding to a groupcast transmission sent by the UE 110. Since the air interface between the UE 110 and the UE 112 is the same for the sidelink and the groupcast, HARQ feedback corresponding to the groupcast may be used for radio link monitoring of the sidelink.

Alternatively, L2 protocols may be configured to specify that when a radio link control (RLC) in unacknowledged mode (UM) bearer is used for the sidelink, HARQ shall not be disabled. When an RLC in acknowledged mode (AM) bearer is used for the sidelink, even when HARQ is disabled, RLC status reports and indications of RLC failures may be used to identify radio link issues with the sidelink. Accordingly, RLC status reports and indications of RLC failures may be used to corroborate the assumption that DTX feedback is due to the degradation in quality of the sidelink.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:

1. A method, comprising:
    at a user equipment (UE) configured with a sidelink:
        transmitting a signal over the sidelink;
        receiving an indication of a type of hybrid automatic repeating request (HARQ) feedback in response to the signal;
        generating a radio link metric associated with the sidelink based on the type of HARQ feedback;
        determining that the radio link metric satisfies a predetermined threshold;
        initiating a keep alive procedure for the sidelink based on the radio link metric satisfying the predetermined threshold;
        receiving a plurality of instances of HARQ feedback, wherein generating the radio link metric associated with the sidelink is based on a type of HARQ feedback for each of the plurality of instances of HARQ feedback;
identifying an instance of HARQ feedback from the plurality of instances of HARQ feedback, as nothing received (DTX) feedback;
determining whether the DTX feedback was received adjacent to further DTX feedback or negative acknowledgement (NACK) feedback; and
when the DTX feedback was received adjacent to the further DTX feedback or the negative acknowledgement (NACK) feedback, omitting the DTX feedback from being a factor that provides a basis for generating the radio link metric.

2. The method of claim 1, further comprising:
transmitting a keep alive message to a further UE, wherein the sidelink corresponds to the UE and the further UE;
determining whether a response to the keep alive message is received within a predetermined duration; and
when the response to the keep alive message is not received within the predetermined duration, declaring a radio link failure (RLF) for the sidelink.

3. The method of claim 1, wherein generating the radio link metric includes:
setting the radio link metric to an initial value in response to establishing the sidelink; and
updating the radio link metric to a new value based on the type of HARQ feedback.

4. The method of claim 3, further comprising:
when the type of HARQ feedback is nothing received (DTX), updating the radio link metric includes increasing a value of the radio link metric by a first value.

5. The method of claim 4, further comprising:
when the type of HARQ feedback is a negative acknowledgement (NACK), updating the radio link metric includes increasing the value of the radio link metric by a second value,
wherein the first value is greater than the second value.

6. The method of claim 3, further comprising:
when the type of HARQ feedback is an acknowledgement (ACK), updating the radio link metric includes resetting the radio link metric to the initial value.

7. The method of claim 1, wherein the predetermined threshold is based on an indication in a message received from a cell of a network via a broadcast or dedicated signaling.

8. A method comprising:
at a user equipment (UE) configured with a sidelink:
transmitting a signal over the sidelink to a further UE;
receiving an instance of hybrid automatic repeating request (HARQ) feedback;
determining whether the instance of HARQ feedback is to be utilized to generate a radio link metric associated with the sidelink, wherein the instance of HARQ feedback is a type of HARQ feedback;
when the instance of HARQ feedback is to be utilized to generate the radio link metric associated with the sidelink, generating the radio link metric associated with the sidelink based on the type of HARQ feedback;
identifying the instance of HARQ feedback as nothing received (DTX) feedback;
determining whether the DTX feedback was received adjacent to further DTX feedback or negative acknowledgement (NACK) feedback; and
when the DTX feedback was received adjacent to the further DTX feedback or the negative acknowledgement (NACK) feedback, omitting the DTX feedback from being a factor that provides a basis for generating the radio link metric.

9. The method of claim 8, wherein determining whether the instance of HARQ feedback is to be utilized to generate the radio link metric associated with the sidelink includes:
identifying that the further UE is configured with a further communication link; and
identifying an indication that the further communication link is likely to prevent the further UE from transmitting HARQ feedback to the UE.

10. The method of claim 9, wherein identifying that the further UE is configured with the further communication link is based on monitoring a physical sidelink control channel (PSCCH).

11. The method of claim 9, further comprising:
omitting the instance of HARQ feedback from being used to generate the radio link metric based on identifying the indication that the further communication link is likely to prevent the further UE from transmitting HARQ feedback to the UE.

12. The method of claim 8, wherein determining whether the instance of HARQ feedback is to be utilized to generate the radio link metric associated with the sidelink includes collecting measurement data associated with the sidelink.

13. The method of claim 12, wherein the measurement data is a channel busy ratio (CBR).

14. The method of claim 8, wherein the instance of HARQ feedback is received in response to the signal.

15. The method of claim 8, wherein the instance of HARQ feedback corresponds to a transmission performed by the UE over a different sidelink.

16. The method of claim 8, wherein the sidelink is utilized for unicast transmission and the instance of HARQ feedback corresponds to a groupcast transmission.

17. A user equipment (UE), comprising:
a transceiver configured to communicate via a sidelink; and
a processor configured to perform operations, the operations comprising:
transmitting a signal over the sidelink;
receiving an indication of a type of hybrid automatic repeating request (HARQ) feedback in response to the signal;
generating a radio link metric associated with the sidelink based on the type of HARQ feedback;
determining that the radio link metric satisfies a predetermined threshold;
initiating a keep alive procedure for the sidelink based on the radio link metric satisfying the predetermined threshold;
receiving a plurality of instances of HARQ feedback, wherein generating the radio link metric associated with the sidelink is based on a type of HARQ feedback for each of the plurality of instances of HARQ feedback;
identifying an instance of HARQ feedback from the plurality of instances of HARQ feedback, as nothing received (DTX) feedback;
determining whether the DTX feedback was received adjacent to further DTX feedback or negative acknowledgement (NACK) feedback; and
when the DTX feedback was received adjacent to the further DTX feedback or the negative acknowledgement (NACK) feedback, omitting the DTX feedback from being a factor that provides a basis for generating the radio link metric.

18. The UE of claim 17, the operations further comprising:
- transmitting a keep alive message to a further UE, wherein the sidelink corresponds to the UE and the further UE;
- determining whether a response to the keep alive message is received within a predetermined duration; and
- when the response to the keep alive message is not received within the predetermined duration, declaring a radio link failure (RLF) for the sidelink.

* * * * *